3,471,723
METHOD AND APPARATUS UTILIZING AN MHD ELECTRIC POWER GENERATOR FOR THERMAL FIXATION OF ATMOSPHERIC NITROGEN
Frank Maslan, Newton Center, Mass., assignor to Avco Corporation, Cincinnati, Ohio, a corporation of Delaware
Continuation-in-part of application Ser. No. 392,779, Aug. 28, 1964. This application Mar. 20, 1968, Ser. No. 718,305
(Filed under Rule 47(b) and 35 U.S.C. 118)
Int. Cl. H02k 45/00
U.S. Cl. 310—11     9 Claims

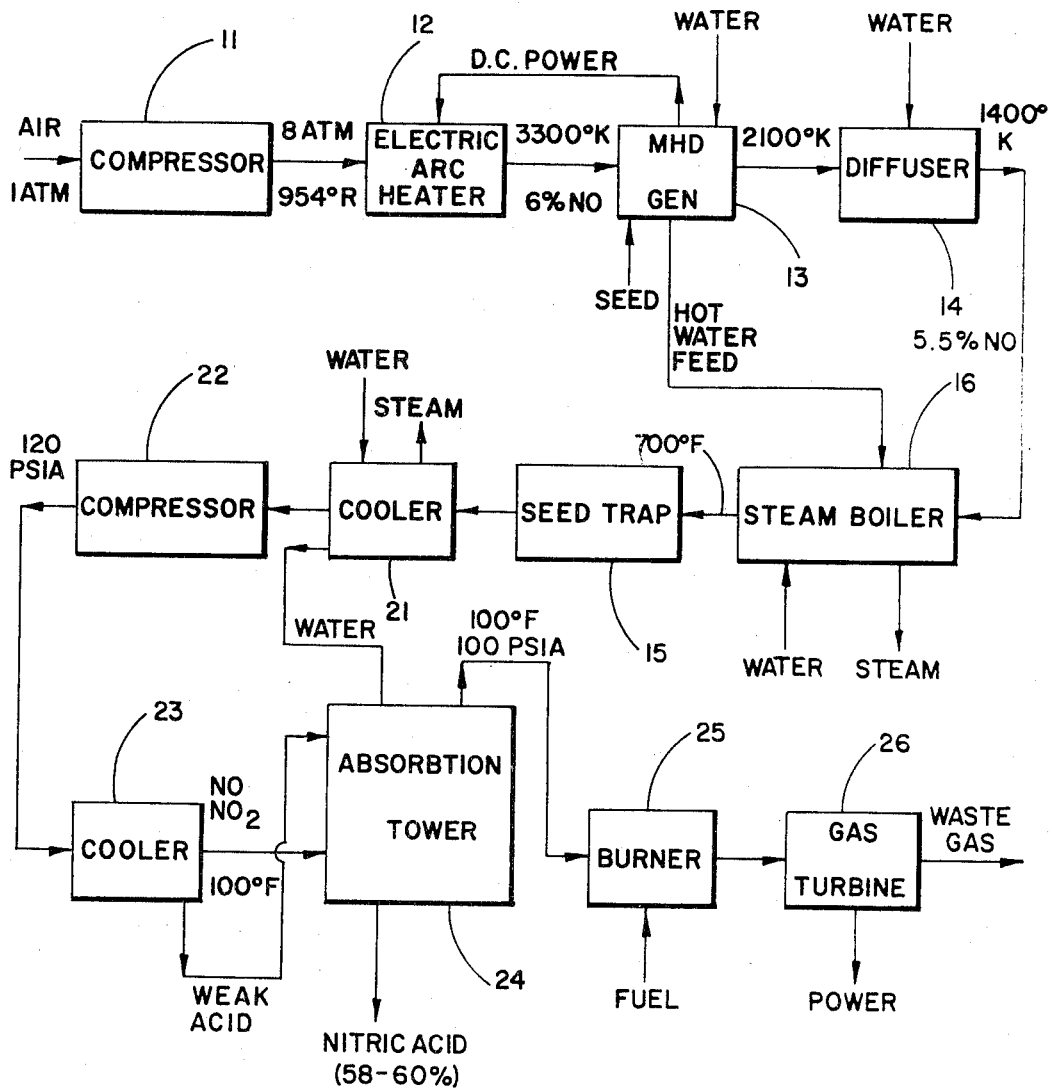

ABSTRACT OF THE DISCLOSURE

The method of and apparatus for the thermal fixation of atmospheric nitrogen which utilizes an electric arc heater to form nitric oxide and cooling means including a magnetohydrodynamic generator to substantially cool produced nitric oxide and preferably supply electrical power for the electric arc heater. Preferably, atmospheric air seeded or otherwise treated in accordance with prior art teaching to increase its electrical conductivity, heated by an electric arc to a temperature in excess of 1500° K. or 2242° F. to produce nitric oxide, and passed through a magnetohydrodynamic generator is rapidly cooled first in the generator and then upon emergence therefrom. The magnetohydrodynamic generator cools the gas by removal of energy in the form of electrical energy, which energy can be supplied to the electric arc heater. Upon emergence of the gas from the generator its velocity is reduced and it is further cooled to fix the produced nitric oxide.

---

This invention relates to a method and apparatus for thermal fixation of atmospheric nitrogen and more particularly to improvements in the electric arc method and apparatus for thermally fixing atmospheric nitrogen as nitric oxide. While the use of an electric arc is not essential and the invention has general application to all suitable gas reactions, it will be illustrated and described particularly in connection with the electric arc method.

This application is a continuation-in-part of application Ser. No. 392,779, filed Aug. 28, 1964.

If air containing molecular nitrogen and oxygen is heated to a very high temperature, a small percentage of nitric oxide (NO) is formed according to the reaction:

$$N_2 + O_2 \rightleftharpoons 2NO \qquad (1)$$

This equilibrium percentage "fixed" is a function of temperature; the higher the temperature, the more NO formed. If the hot gas is cooled very rapidly, the NO does not have time to decompose and the high temperature equilibrium is frozen. The more rapid the cooling, the higher the yield of NO.

Heretofore, two processes have actually been used for thermal nitrogen fixation, one being the electric arc process and the other being a process using pebble bed furnaces. In the electric arc process, the air is heated to a high temperature, such as for example 3600° K. (about 6032° F.), by an electric arc. The hot air is cooled by heat exchange with cold air, which is a relatively slow process and, accordingly, results in low yields of NO. Heretofore, the electric arc process for commercial purposes has been considered too costly. Accordingly, over the years, the electrical arc process fell into disfavor and attention was directed to the pebble bed process.

In the pebble bed process, the heating is by combustion of preheated air in a pebble bed furnace and the cooling is generally by heat transfer to the pebbles of a second pebble bed furnace. Cooling a gas by contact with a solid surface, while much faster than the heat exchange method, is still slow and the operating temperature is limited by the construction materials. Moreover, the yield of NO otherwise available is reduced by the consumption of oxygen for combustion. Furthermore, commercially satisfactory results have been obtained for only relatively short periods of time because the required operating temperatures result in rapid deterioration of the pebble bed furnaces.

At the present time, the arc method of nitrogen fixation is of comparatively little, if any, importance in the United States as a factor in the fixation of nitrogen, and of distinctly minor importance from a world standpoint. A review of the locations of plans which once used the arc method reveals a high degree of localization in places where electric power is plentiful and but few industries using that power. The investment per ton of product in the prior art arc method compares unfavorably with other fixation methods such as the pebble furnace method and it operates at very low efficiencies of energy utilization. Against this impressive list of faults can be set two features possessed exclusively by the arc method, namely: it uses directly the fewest, cheapest, and most plentiful of raw materials, namely, air and water; and produces directly a highly desirable form of fixed nitrogen product. For a thorough discussion of all aspects of the electric arc process including the patent and factual history thereof, reference is made to "Fixed Nitrogen" by H. A. Curtis, American Chemical Society Monograph, The Chemical Catalog Co., Inc. (1932).

In accordance with the present invention, atmospheric air is preferably supplied under compression to and preheated in a preheater furnace of any suitable type and then supplied to an arc heater furnace to heat the air to a temperature sufficient to permit the formation of NO and render the air electrically conductive. Thereafter, the effluent from the arc heater is passed through a magnetohydrodynamic (hereinafter referred to as MHD) generator which functions to supply current to the arc heater and substantially cool the effluent from the arc heater. If desired, the air supply to the MHD generator may be "seeded" to further increase and provide practical levels of electrical conductivity required for efficient MHD generator operation. After leaving the MHD generator, the effluent is most conveniently passed through a first preheater to further recover heat from the effluent and a second preheater to preheat the air supplied to the arc heater.

The general object of the present invention is to provide a new and improved method and apparatus for thermal fixation of atmospheric nitrogen.

It is another object of the present invention to increase the efficiency of energy utilization in the electric arc process for fixing nitrogen.

Another object of the present invention is to provide a commercially practical method and apparatus for the thermal fixation of atmospheric nitrogen utilizing an electric arc.

A further object of the present invention is to provide a thermal process employing an MHD generator for the fixation of atmospheric nitrogen.

A still further object of the present invention is to combine the best features of the electric arc process and the pebble bed process to provide operation under conditions of high efficiency over extended if not indefinite periods of time.

More specifically, it is an object of the present invention to utilize an MHD generator to supply at least in part the electrical current necessary to heat atmospheric air in the electric arc process and simultaneously cool the effluent from the electric arc almost instantaneously to temperatures at which the rate of decomposition of nitric oxide is significantly reduced and the effluent from the MHD generator can be supplied to regenerative heaters without materially affecting the efficiency or operation of such heaters.

The novel features that are considered characteristic of the invention are set forth in the appended claims; the invention itself, however, both as to its organization and method of operation, together with additional objects and advantages thereof, will best be understood from the following description of a specific embodiment, when read in conjunction with the accompanying drawing which is a schematic block diagram of apparatus for carrying out the invention.

Referring now to the drawing, which is a schematic block diagram of apparatus for carrying out the invention, there is shown a conventional compressor 11 for supplying ambient air at elevated pressures to a conventional electric furnace 12, such as for example an electric arc furnace or heater. If desired, a conventional preheater (not shown) operating on waste heat from the system, may be inserted between the compressor 11 and the electric arc furnace 12 to raise the temperature of the air prior to its introduction into the electric arc furnace. In the electric arc furnace, the air is heated to a reaction temperature in excess of not less than 1500° Kelvin (about 2242° F.) and preferably in excess of 2000° K. (about 3137° F.), such as for example 3300° Kelvin (about 5482° F.), and maintained at this reaction temperature for a time sufficient to permit the formation of a significant percent of nitric oxide, such as for example 3–6% by volume.

After the gas has been supplied to and heated in the electric arc furnace in conventional manner, it is then expanded through a magnetohydrodynamic (hereinafter referred to as "MHD") generator 13, which performs the important function of not only generating electrical energy but also the more important function of very rapidly reducing the temperature of the heated gas. This reduction in temperature is performed at least in part by generating electrical energy in the MHD generator and thereby removing energy in the form of electrical energy from the gas at a rate sufficient to cool the gas passing through the generator to a temperature at which the rate of decomposition of the produced nitric oxide is substantially reduced compared to its rate of decomposition at about its maximum reaction temperature at or just downstream of the electric arc furnace. Since the gas inlet end of a duct for MHD generators generally comprises an expansion nozzle, it will not be necessary to separately provide an expansion nozzle. An MHD generator of the type suitable for use in carrying out the present invention is disclosed, for example, in Patent No. 3,264,501.

After passing through the MHD generator, the hot gas or effluent from the MHD generator is, principally due to its velocity, passed through a diffuser 14 adapted to reduce the velocity of the hot gas without materially increasing the temperature thereof. This may be most easily accomplished, for example, by the injection of water into the hot gas.

When it is necessary to inject seed, such as for example at the inlet of the MHD generator, to produce practical values of electrical conductivity of the gas in the MHD generator, the seed may be recovered by means of an electrostatic seed trap 15 or the like disposed at the outlet of the steam boiler 16. In the MHD generator art, numerous methods and apparatus for providing practical values of electrical conductivity of the gas in an MHD generator are well known. For example, thermal ionization, nonequilibrium ionization, introducing electron rays, passing the gas through a highly tensioned electric field, photo ionization, etc. and means therefor have been proposed. Accordingly, while the principle of providing practical values of electrical conductivity is essential to the invention, no particular method or apparatus therefor is essential to the invention.

The gas may be heated to at least around 2000° F. because condensation of alkali or seed commences around 2000° F. Thus, since there are essentially no impurities in the gas exhausted from the diffuser, the seed may be recovered in the seed trap by precipitation of the seed in an efficient electrostatic precipitator. At the outlet of the diffuser 14, the temperature of the gas preferably has been reduced to a value less than the decomposition temperature of nitric oxide. Thus, at this point, the remaining produced nitric oxide has been fixed and may be recovered in the usual manner. However, because the present invention permits the realization of temperatures greater than that heretofore considered practical, the steam boiler 16 may be provided to receive the hot gas and generate steam for use in other parts of the system or elsewhere as desired. The balance of the system may comprise a conventional nitric oxide recovery system such as a cooler 21 for further reducing the temperature of the gas to permit it to be introduced to a compressor 22. The gas may then be further cooled at cooler 23 and supplied in conventional manner to a conventional absorption tower 24 for producing nitric acid. If the effluent from the absorption tower 24 contains sufficient oxygen, it may be supplied to a burner 25 and burned with a suitable fuel to drive a gas turbine 26 or the like to supply the necessary power for the compressors 11 and 22.

The construction and operation for nitrogen fixation, of a suitable electric arc heater and a nitric oxide recovery system, is thoroughly discussed in the aforementioned book entitled, "Fixed Nitrogen" and elsewhere in the technical literature and patents. Accordingly, those skilled in the art are thoroughly familiar with the construction and operation of these components and a further discussion thereof is not believed necessary, particularly since they are not essential to the present invention. Thus, while the use of an electric arc heater is preferred because it permits the most effective use of the electrical output in the MHD generator, other heating means, such as for example a graphite heater, may be used, the only requirement being that the maximum reaction temperature achieved be sufficient to produce nitric oxide in practical quantities.

Directing attention now to the MHD generator, in general terms, MHD generators produce electrical energy by movement of an electrically conductive fluid relative to a magnetic field. The fluid employed is usually an electrically conductive gas from a high temperature, high pressure source. From the source, the fluid flows through the generator and by virtue of its movement relative to the magnetic field induces an electromotive force between opposed electrodes within the generator. The gas may exhaust to a sink, which may simply be the atmosphere or in more sophisticated systems, the gas may exhaust to a recovery system including pumping means for returning the gas to the source.

Several different gases may be used; the gas may simply be air or may comprise inert gases such as helium or argon. In open systems, i.e., those in which the gases are not recovered after passing through the power plant, air is normally used. In closed systems, in which the gases are recovered and recirculated, it is feasible to use relative expensive gases such as helium and argon. To promote electrical conductivity, the gases are heated to a high temperature; conductivity may also be increased by the addition to the gases of a substance that ionizes readily at the operating temperature of the generator. Regardless of the gas used, it comprises a mixture of electrons, positive ions and neutral atoms, which, for convenience, may be termed "plasma."

A knowledge of MHD generator principles will promote understanding of the present invention. The conventional linear MHD generator comprises a tapered duct to which high temperature, high pressure, electrically conductive plasma is introduced at one end and exhausted from the other end. The pressure at the exit of the duct is lower than at the inlet of the duct; and for this reason, the plasma moves at high velocity through the duct. By properly choosing the pressure differential and the shape of the duct, the plasma can be made to move through the duct at substantially constant velocity, which is desirable, although not necessary, to the operation of the generator. Surrounding the exterior of the duct is a continuous electrical conductor in the form of a coil to which electrical current may be supplied from any conventional source or from the generator itself. Flow of the electrical current through the coil, which is preferably of the superconducting type, establishes a magnetic flux through the duct perpendicular to the direction of the plasma flow.

Within the duct are provided a plurality of opposed electrodes which generally extend from about the beginning to the end of the magnetic field. These electrodes extend along the interior of the duct parallel to the direction of plasma flow and are generally positioned adjacent one another on axes perpendicular to both the direction of plasma movement and the magnetic flux.

High velocity movement of the electrically conductive plasma through the magnetic field induces a unidirectional EMF between the electrodes. Opposed pairs of electrodes may, for example, be connected to a load or loads through which electrical current flows under the influence of the EMF induced between the electrodes.

A significant feature of an MHD generator is that the plasma must be a conductor of electricity. Electrical conductivity of gases is a very steep function of temperature and it has been found that the electrical conductivity of suitable gases is far too low for the MHD generator to be practical even at peak combustion temperatures of 5000° F. Enhancement of the gas conductivity is therefore required in order to provide a practical working fluid in an MHD generator. The most widely used process of enhancing the gas conductivity is known as seeding and consists of adding to the gas, preferably at about the beginning of the upstream end of the magnetic field, a relatively small amount of an easily ionizable (ionizable at 1500° K.) impurity called seed, such as an alkali metal. In practice, seeding is done by adding an alkali salt rather than the more expensive pure alkali metal. Because its ionization potential is low and due to economical considerations, potassium is generally selected as seed. Where the products of combustion are used, the amount of potassium required is about 0.2% by volume in the gases after combustion. For a more comprehensive discussion of the injection of seed in an MHD generator and apparatus therefor, reference is made to patent application Ser. No. 86,628, filed Feb. 2, 1961, now Patent No. 3,210,576.

The type of generator disclosed in the aforementioned Patent No. 3,264,501 is of the linear type. This type of generator is also referred to as a Faraday type generator. A Hall current MHD generator, as disclosed for example in Patent No. 3,091,709, may also be used as may disc and other differently shaped generators. For a discussion of disc shaped generators, reference is made to patent application Ser. No. 434,341, filed Feb. 23, 1965. As will now be seen, while the principle of MHD electric power generation is essential to the present invention, no particular kind of MHD generator is essential to the invention.

To date, the greatest emphasis of the MHD art has been given combustion-heated devices wherein fuels are burned to achieve temperatures of about 5000° F. Recently, an MHD generator was successfully operated using nonequilibrium ionization of the working gas. In this case, seeded argon was heated in a graphite heater to about 2900° F. In the generator, the electron temperature was approximately 3600° F. Such an arrangement may also be used in the present invention.

While the principal cooling occurs in the MHD generator 13 further cooling for practical applications is necessary and is achieved in the diffuser 14 which preferably functions to rapidly reduce the velocity of the effluent from the MHD generator to a velocity compatible with conventional steam boilers, heat exchangers, and the like, and simultaneously rapidly reduce the temperature of the effluent from the MHD generator to a temperature less than the decomposition temperature of NO. A velocity compatible with conventional steam boilers and the like is a velocity less than supersonic. The above is simply and conveniently achieved by the diffuser or water quench 14, which by the injection of water into the gas provides extremely fast evaporation of the water and intimate contact of water droplets and gas. Injection of water into the gas results in extremely fast evaporation (a few milliseconds) of the water at the water-gas interface and thus rapidly cools the gas to the required temperature before a significant amount of NO decomposes. While a diffuser or a water quench device has been shown and described, it is to be understood that the invention is not so limited and that other suitable means for reducing the velocity and/or temperature of the effluent from the MHD generator may be used if desired. It should be noted, however, that if the diffuser merely reduces the velocity of the effluent from the generator, it should do so without increasing the temperature of the effluent. Accordingly, as will be clearly evident, in accordance with the invention, the necessary reduction in velocity and cooling may occur simultaneously in a diffuser or, alternately, the described reduction in velocity without an increase in temperature may be provided in the diffuser and further and final cooling downstream of the diffuser.

By way of example and not of limitation, air may be compressed at compressor 11 to 8 atmospheres and a temperature of 954° Rankine. Thereafter, the compressed air may be heated in the arc heater 12 to a temperature of about 3300° K. or about 5482° F. At these conditions, 6% volume NO will be formed. The hot gas is then expanded through the entrance nozzle, preferably to supersonic velocities, and then through the duct of the MHD generator and exhausted at a pressure of 1.20 atmospheres and a temperature of about 2100° K. or 3322° F. Since the residence time in the MHD generator is a few milliseconds (10 milliseconds or less) only a small or negligible fraction of the produced NO decomposes in the generator. The gas is preferably thereafter directly introduced into the diffuser or its equivalent.

Where a water quench is used, water is sprayed in sufficient quantity to lower the gas temperature to about 1400° K. or 2062° F. Since the water quench is extremely fast the residence time in the diffuser is only a few milliseconds. The total residence time of the heated gas in the MHD generator, velocity reducing means, and cooling means must be sufficiently short, such as for example not in excess of about 0.10 second, to prevent decomposition of said produced nitric oxide to more than a minor extent. Accordingly, the gas leaving the diffuser will contain about 5.5% NO. Since the remaining portion of the produced NO is fixed in the diffuser, the gas may for purposes of efficiency be passed through a steam boiler and cooled to 700° F. The produced steam may be used, for example, to generate additional electricity for the arc heater.

The seed may now be recovered, the gas further cooled and thereafter supplied to a conventional pressure nitric acid system. Since the gas is richer in oxygen than in the usual nitric acid system, it may now be burned with a fuel as at burner 25 to achieve a further recovery of energy. The present invention premits a high energy recovery and the production of 58–60% nitric acid.

The various features and advantages of the construction disclosed are thought to be clear from the foregoing description of the preferred embodiment. Others, not specifically enumerated, will undoubtedly occur to those versed in the art, as likewise will many advantages and modifications of the preferred embodiment of the invention illustrated, all of which may be achieved without departing from the spirit and scope of the invention, as defined by the following claims.

I claim:

1. In the method of making nitric oxide from a gas containing nitrogen and oxygen, the steps comprising:
   (a) heating said gas in an electric arc heater in the absence of combustion to a reaction temperature in excess of about 2000° Kelvin to produce nitric oxide;
   (b) seeding said gas with a sufficient quantity of material thermally ionizable at said reaction temperature to render said heated gas practically electrically conductive;
   (c) passing said seeded and heated gas in less than about ten milliseconds through an MHD generator adapted to generate electrical energy, thus removing energy in the form of electrical energy from said seeded and heated gas as it passes through said generator and cooling said gas to a temperature at which the rate of decomposition of said produced nitric oxide is substantially reduced compared to its rate of decomposition at about its said reaction temperature;
   (d) supplying at least a part of said electrical energy to said electric arc heater; and
   (e) reducing the velocity of said gas after it leaves said MHD generator and removing energy in the form of heat from said gas to cool said gas to a temperature at which the rate of decomposition of said produced nitric oxide becomes negligibly slow, said removal of energy in the form of electrical energy and heat and said reduction in velocity of said gas being accomplished at a rate that decomposition of said produced nitric oxide to a substantial extent is prevented.

2. In the method of making nitric oxide from a gas containing nitrogen and oxygen, the steps comprising:
   (a) heating said gas in an electric arc heater to a reaction temperature at which nitrogen and oxygen react to form nitric oxide;
   (b) increasing the electrical conductivity of said gas over that of said gas when merely heated to said reaction temperature of said heated gas;
   (c) passing said electrically conductive gas at supersonic velocity in less than about ten milliseconds through an MHD generator adapted to generate electrical energy, thus removing energy in the form of electrical energy from said electrically conductive gas as it passes through said generator and cooling said gas to a temperature at which the rate of decomposition of said produced nitric oxide is substantially reduced compared to its rate of decomposition at about its said reaction temperature;
   (d) supplying at least a part of said electrical energy to said electric arc heater;
   (e) reducing the velocity of said gas to a velocity substantially less than supersonic after it leaves said MHD generator without substantially increasing the temperature thereof; and
   (f) thereafter removing energy in the form of heat from said gas to cool said gas to a temperature at which the rate of decomposition of said produced nitric oxide becomes negligibly slow, said removal of energy in the form of electrical energy and heat and said reduction in velocity of said gas being accomplished at a rate that decomposition of said produced nitric oxide to a substantial extent is prevented.

3. In the method of making nitric oxide from a gas containing nitrogen and oxygen, the steps comprising:
   (a) heating said gas at elevated pressure in an electric arc heater to a reaction temperature at which nirogen and oxygen react to form nitric oxide and the electrical conductivity of said gas is increased over that of said gas prior to heating in said electric arc heater;
   (b) further increasing the electrical conductivity of said gas over that of said gas when merely heated to said reaction temperature in said electric arc heater, said increase rendering said gas practically electrically conductive for use in an MHD generator;
   (c) passing said practically electrically conductive gas at supersonic velocity in less than about ten milliseconds through an MHD generator adapted to generate electrical energy, thus removing energy in the form of electrical energy from said electrically conductive gas as it passes through said generator and cooling said gas to a temperature at which the rate of decomposition of said produced nitric oxide is substantially reduced compared to its rate of decomposition at about its said reaction temperature;
   (d) supplying at least a part of said electrical energy to said electric arc heater; and
   (e) thereafter substantially simultaneously reducing the velocity of said gas to a velocity substantially less than supersonic after it leaves said MHD generator and removing energy in the form of heat from said gas to cool said gas to a temperature at which the rate of decomposition of said produced nitric oxide becomes negligibly slow, said removal of energy in the form of electrical energy and heat and said reduction in velocity of said gas being accomplished at a rate that decomposition of said produced nitric oxide to a substantial extent is prevented.

4. The method as defined in claim 3 wherein said removal from said gas of energy in the form of electrical energy and heat, whereby the said rate of decomposition of said produced nitric oxide to a substantial extent is prevented, is completed in a time interval not exceeding 0.10 second.

5. In apparatus for making nitric oxide from a gas containing nitrogen and oxygen wherein said nitrogen-oxygen mixture is heated to a reaction temperature at which nitrogen and oxygen react to form nitric oxide, thereafter the resulting gaseous reaction mixture is cooled and thereafter the nitric oxide so produced is recovered, the combination comprising:
   (a) electric arc heater means for heating said gas to a reaction temperature in excess of 1500° Kelvin sufficient to produce nitric oxide;
   (b) means for introducing a substance ionizable at 1500° Kelvin to render said heated gas practically electrically conductive for use in MHD generators;
   (c) an MHD generator for receiving said electrically conductive gas and generating electrical energy at a rate sufficient to cool said gas as it passes through said generator in less than about ten milliseconds to a temperature at which the rate of decomposition of said produced nitric oxide is substantially reduced as compared to its rate of decomposition as it leaves said heating means;
   (d) means for introducing said electrically conductive gas into said MHD generator at a supersonic velocity;
   (e) means for reducing the velocity of said heated gas as it leaves said MHD generator to a velocity substantially less than supersonic without substantially increasing the temperature of said gas; and
   (f) means for receiving said gas from said velocity reducing means and cooling said gas to a temperature at which the rate of decomposition of nitric oxide becomes negligibly slow, the total residence time of said heated gas in said MHD generator, velocity reducing means, and cooling means being sufficiently short to prevent decomposition of said produced nitric oxide to more than a minor extent.

6. The combination as defined in claim 5 including means for coupling at least a part of said generated electrical energy to said electric arc heater means.

7. In apparatus for making nitric oxide from a gas containing nitrogen and oxygen wherein said nitrogen-oxygen mixture is heated to a reaction temperature at which nitrogen and oxygen react to form nitric oxide, thereafter the resulting gaseous reaction mixture is cooled and thereafter the nitric oxide so produced is recovered, the combination comprising:

(a) means for heating said gas in the absence of combustion to a reaction temperature in excess of 1500° Kelvin sufficient to produce nitric oxide;

(b) means for introducing a substance ionizable at 1500° Kelvin to render said heated gas practically electrically conductive for use in MHD generators; and (c) means including MHD generator means for cooling said electrically conductive gas in a time interval of not exceeding 0.1 second, from said reaction temperature to a temperature at which the rate of decomposition of nitric oxide becomes negligibly slow, said MHD generator means being adapted to receive said electrically conductive gas at supersonic velocity and generate electrical energy to cool said gas as it passes through said MHD generator in less than about ten milliseconds to a temperature at which the rate of decomposition of said produced nitric oxide is substantially reduced as compared to its rate of decomposition as it leaves said heating means.

8. The combination as defined in claim 7 and additionally including means for reducing the velocity of said heated gas as it leaves said MHD generator means to a velocity substantially less than supersonic without substantially increasing the temperature of said heated gas.

9. The combination as defined in claim 8 wherein said means for heating said gas in the absence of combustion is an electric arc heater, and additionally including means for coupling at least a part of said generated electrical energy to said electric arc heater.

References Cited
UNITED STATES PATENTS

| | | | |
|---|---|---|---|
| 814,917 | 3/1906 | Pauling | 23—163 |
| 1,443,091 | 1/1923 | Petersen | 310—11 X |
| 3,303,364 | 2/1967 | Hals | 310—11 |
| 2,936,548 | 5/1960 | Morrison | 47—58 |
| 3,149,915 | 9/1964 | Thomsen | 23—163 |

DAVID X. SLINEY, Primary Examiner

U.S. Cl. X.R.

23—163